United States Patent
Saimen et al.

(10) Patent No.: US 12,183,920 B2
(45) Date of Patent: Dec. 31, 2024

(54) POROUS DIELECTRIC PARTICLE, ELECTRODE FOR LITHIUM ION SECONDARY BATTERY, AND LITHIUM ION SECONDARY BATTERY

(71) Applicant: HONDA MOTOR CO., LTD., Tokyo (JP)

(72) Inventors: Kazuki Saimen, Saitama (JP); Takashi Nakagawa, Saitama (JP); Yuka Nagatochi, Saitama (JP); Takeshi Fujino, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 880 days.

(21) Appl. No.: 17/194,307

(22) Filed: Mar. 7, 2021

(65) Prior Publication Data

US 2021/0288319 A1     Sep. 16, 2021

(30) Foreign Application Priority Data

Mar. 10, 2020  (JP) ................. 2020-041341

(51) Int. Cl.
*H01M 4/485*     (2010.01)
*H01M 10/0525*   (2010.01)
*H01M 4/02*      (2006.01)

(52) U.S. Cl.
CPC ....... *H01M 4/485* (2013.01); *H01M 10/0525* (2013.01); *H01M 2004/027* (2013.01); *H01M 2004/028* (2013.01)

(58) Field of Classification Search
None
See application file for complete search history.

(56) References Cited

U.S. PATENT DOCUMENTS

| | | |
|---|---|---|
| 2017/0194626 A1 | 7/2017 | Yamamura et al. |
| 2017/0263939 A1 | 9/2017 | Lin et al. |
| 2019/0214629 A1* | 7/2019 | Andre ............ H01M 4/13 |
| 2020/0203723 A1* | 6/2020 | Choi ............ C08F 212/08 |
| 2021/0202984 A1 | 7/2021 | Fujino et al. |
| 2021/0210758 A1 | 7/2021 | Saimen et al. |

FOREIGN PATENT DOCUMENTS

| | | |
|---|---|---|
| JP | 2001283861 A | 10/2001 |
| JP | 2008288091 A | 11/2008 |
| JP | 2008300098 A | 12/2008 |
| JP | 2009043536 A | 2/2009 |
| JP | 2010175854 A | 8/2010 |
| JP | 2011210694 A | 10/2011 |
| JP | 2016119180 A | 6/2016 |
| JP | 2018517285 A | 6/2018 |
| JP | 2019114323 A | 7/2019 |
| WO | 2019225387 A1 | 11/2019 |
| WO | 2019225437 A1 | 11/2019 |

OTHER PUBLICATIONS

Machine Translation of JP2008300098 (Year: 2008).*
Machine translation of JP 2009043536 (Year: 2009).*
Office Action issued in the CN Patent Application No. 202110244644.5, mailed on Oct. 14, 2023.
Office Action issued in the CN Patent Application No. 202110244644.5, mailed on Apr. 4, 2024.
Decision of Refusal issued Jul. 18, 2024 in the CN Patent Application No. 202110244644.5.
Notice of Reasons for Refusal issued Oct. 31, 2023 in the JP Patent Application No. 2020-041341.

* cited by examiner

*Primary Examiner* — Wyatt P McConnell
(74) *Attorney, Agent, or Firm* — CKC & Partners Co., LLC

(57) ABSTRACT

To provide a porous dielectric particle capable of achieving a lithium ion secondary battery having a high volumetric energy density, a high output, and being scarcely deteriorated in the output property even after charge and discharge are repeated, an electrode for a lithium ion secondary battery including the porous dielectric particle, and a lithium ion secondary battery using the electrode for a lithium ion secondary battery.

A porous dielectric oxide is used, and this is dispersed and disposed in gaps between active material particles of an electrode.

Specifically, as a particle to be blended in an electrode of a lithium ion secondary battery including an electrolytic solution, porous dielectric particles in which at least a part of a surface of porous core particles is coated with dielectric oxide is used.

6 Claims, No Drawings

POROUS DIELECTRIC PARTICLE, ELECTRODE FOR LITHIUM ION SECONDARY BATTERY, AND LITHIUM ION SECONDARY BATTERY

This application is based on and claims the benefit of priority from Japanese Patent Application No. 2020-041341, filed on 10 Mar. 2020, the content of which is incorporated herein by reference.

BACKGROUND OF THE INVENTION

Field of the Invention

The present invention relates to a porous dielectric particle, an electrode for a lithium ion secondary battery including the porous dielectric particle, and a lithium ion secondary battery using the electrode for a lithium ion secondary battery.

Related Art

Conventionally, lithium ion secondary batteries have been widely available as secondary batteries having a high energy density. A lithium ion secondary battery using a liquid as an electrolyte has a structure in which a separator is provided between a positive electrode and a negative electrode, and a liquid electrolyte (an electrolytic solution) is filled.

The lithium ion secondary battery has various requirements depending on the application of use.

For example, for automobiles etc., it is desirable that batteries have high volumetric energy density and have an output property that is scarcely deteriorated even after charging and discharging are repeated.

Herein, when a filling density of an electrode active material is increased for the purpose of improving the volumetric energy density, gaps between the active material particles of the electrode mixture layer are reduced and an amount of the electrolytic solution held by the electrode is relatively reduced.

When amount of the electrolytic solution held by the electrode becomes smaller, due to an increase in resistance due to shortage of lithium ions, variation in potential occurs, so that a solvent constituting the electrolyte becomes easily decomposed, and a passive film is formed on the electrode.

As a result, electric conductivity of lithium ions is deteriorated, and the internal resistance is increased.

Furthermore, in general, in lithium ion secondary batteries, the output property tends to be deteriorated due to repeated charging and discharging.

This is because an electrolytic solution is decomposed due to repeated charging and discharging, a passive film is generated on an electrode, and internal resistance is gradually increased and the amount of the electrolytic solution becomes insufficient.

In this respect, a technology of allowing an inorganic compound having a relative dielectric constant of 12 or more to be contained in an electrode mixture layer has been proposed (see Patent Document 1). According to this technology, a dissociation degree of an electrolyte salt in a non-aqueous electrolyte is improved, and lithium ion conductivity can be improved.

Furthermore, a technology of sintering a ferroelectric substance having a relative dielectric constant of 500 or more to a positive electrode surface has been proposed (see Patent Document 2). According to this technology, a surface in contact with a non-aqueous electrolytic solution is positively charged, and an interface with a positive electrode active material is negatively charged. In the nonaqueous electrolytic solution, a repulsive force is applied, and in positive electrode active material, an attracting force is applied. Therefore, even in a low-temperature environment, an interface reaction can be allowed to proceed smoothly, and low-temperature output property can be improved.

Furthermore, a technology of allowing dielectric particles having a relative dielectric constant in a range of 500 or more, and having a particle diameter in a range of 200 nm or less to be contained in at least one or more of a positive electrode mixture, a negative electrode mixture, and a separator has been proposed (see Patent Document 3).

According to this technology, since lithium ions in the electrolytic solution in the vicinity of dielectric particles are spuriously solvated with dielectric particles, the dissociation degree of lithium salt is locally improved, and a short-time output property can be improved.

Patent Document 1: Japanese Unexamined Patent Application, Publication No. 2001-283861
Patent Document 2: Japanese Unexamined Patent Application, Publication No. 2011-210694
Patent Document 3: Japanese Unexamined Patent Application, Publication No. 2016-119180

SUMMARY OF THE INVENTION

However, in Patent Documents 1 to 3, an inorganic compound or $BaTiO_3$ as dielectric particles is used.

Since $BaTiO_3$ has a small specific surface area, an effect of improving the dissociation of the electrolytic solution is limited and still insufficient.

In Patent Documents 1 to 3, an additive amount is increased, or fine particles having a size of 200 nm or less are used to improve the output property.

Then, in a technique of increasing the additive amount, the rate of member other than the active material was increased, thus inhibiting an electrode mixture layer from becoming high density, and deteriorating the volumetric energy density.

Furthermore, in a technique using fine particles having a size of 200 nm or less, aggregation of dielectric substance particle occurs, and a movement route of lithium ions in an electrode mixture layer becomes nonuniform, so that variation occurs in the reaction of active material in the electrode mixture layer, causing deterioration of durability.

The present invention has been made in view of the above, and has an object to provide a porous dielectric particle capable of achieving a lithium ion secondary battery having a high volumetric energy density, a high output, and being scarcely deteriorated in the output property even after charge and discharge are repeated, an electrode for a lithium ion secondary battery including the porous dielectric particle, and a lithium ion secondary battery using the electrode for a lithium ion secondary battery.

The present inventors have extensively studied in order to solve the above-mentioned problem.

Then, they found that when porous dielectric oxide is dispersed and disposed in a gap between active material particles of an electrode, a lithium ion secondary battery in which the dissociation degree of ions in an electrolytic solution can be improved; thus association of lithium ions is suppressed, an increase of diffusion resistance of lithium ions can be prevented, an increase in the internal resistance is suppressed, and low resistance is maintained can be achieved, and have completed the present invention.

Specifically, the present invention relates to a porous dielectric particle to be blended in an electrode of a lithium ion secondary battery including an electrolytic solution, the porous dielectric particle including: a porous core particle; and a dielectric oxide that covers at least a part of a surface of the porous core particle.

The dielectric oxide may be at least one of an oxide having lithium ion conductivity, or a high-dielectric oxide.

The dielectric oxide may be a high-dielectric oxide having a powder relative dielectric constant of 10 or more.

The dielectric oxide may be an oxide having a lithium ion conductivity of $10^{-7}$ S/cm or more at 25° C.

The dielectric oxide may be a composite metal oxide having a garnet-type crystal structure represented by a chemical formula: $Li_{7-y}La_{3-x}A_xZr_{2-y}M_yO_{12}$ wherein in the formula, A is one type of metal selected from the group consisting of Y, Nd, Sm, and Gd, x is in a range of $0 \leq x < 3$, M is Nb or Ta, and y is in a range off $0 \leq y < 2$.

The dielectric oxide may be a composite Metal oxide having a NASICON-type crystal structure represented by the chemical formula: $Li_{1+x+y}(Al,Ga)_x(Ti,Ge)_{2-x}Si_yP_{3-y}O_{12}$ (wherein $0 \leq x \leq 1$ and $0 \leq y \leq 1$ are satisfied).

The dielectric oxide may be $LiNbO_3$.

The dielectric oxide may be a composite metal oxide having at least one perovskite-type crystal structure selected from the group consisting of $BaTiO_3$, $Ba_xSr_{1-x}TiO_3$ (z=0.4 to 0.8), and $BaZr_xTi_{1-x}O_3$ (x=0.2 to 0.5).

The core particle may have a specific surface area of 20 $m^2/g$ or more.

A coated amount of the dielectric oxide may be 1 to 30% by volume with respect to a volume of the core particle.

Another aspect of the present invention relates to an electrode for a lithium ion secondary battery, including an electrode active material and the porous dielectric particle.

A blending amount of the porous dielectric particle may be 0.1 parts by mass or more and 5 parts by mass or less with respect to 100 parts by mass of the electrode for a lithium ion secondary battery.

The electrode may be a positive electrode.

The electrode may be a negative electrode.

Still another aspect of the present invention is a lithium ion secondary battery including a positive electrode layer for a lithium ion secondary battery having a positive electrode active material layer including a positive electrode active material; a negative electrode layer for a lithium ion secondary battery having a negative electrode active material layer including a negative electrode active material; a separator disposed between the positive electrode layer for a lithium ion secondary battery and the negative electrode layer for a lithium ion secondary battery; and an electrolytic solution, wherein the positive electrode layer for a lithium ion secondary battery and/or the negative electrode layer for a lithium ion secondary battery includes the above-mentioned porous dielectric particle.

According to the porous dielectric particle of the present invention, both an effect of improving an output of the lithium ion secondary battery and an effect of improving durability can be achieved without inhibiting density of the electrode from increasing. Therefore, it is possible to achieve a lithium ion secondary battery having a high volumetric energy density, a high output, and being scarcely deteriorated in an output property even after charging and discharging are repeated.

Specifically, since the porous dielectric particle of the present invention has a porous structure, a contact interface between a dielectric material and an electrolytic solution can be increased, and a range of action of dissociation of the electrolytic solution can be enlarged; thus the internal resistance of a cell can be reduced.

Furthermore, since a contact area between a dielectric material and an electrolytic solution is increased, an additive amount of the porous dielectric particle of the present invention can be suppressed, and a rate of the active material in the electrode can be increased. As a result, a volumetric energy density of the battery can be improved.

Furthermore, when the porous dielectric particle of the present invention is used, since it is not necessary to add fine particles to the electrode, fine particles are not aggregated and can easily be uniformly dispersed to the electrode mixture.

As a result, a dissociation effect of an electrolytic solution can be acted over the entire electrode mixture.

DETAILED DESCRIPTION OF THE INVENTION

Hereinafter, embodiments of the present invention will be described.

Note here that the present invention is not limited to the following embodiments.

<Porous Dielectric Particle>

The porous dielectric particle of the present invention is a particle to be blended in an electrode of a lithium ion secondary battery including an electrolytic solution, in which at least a part of a surface of a porous core particle is coated with dielectric oxide.

Since at least a part of the surface of the porous core particle is coated with the dielectric oxide, the contact interface between the dielectric material and the electrolytic solution is increased, and a range of action of dissociation of the electrolytic solution can be enlarged. Thus, the internal resistance of a cell can be reduced.

Furthermore, since a contact area between the dielectric material and the electrolytic solution is increased, an additive amount can be suppressed, and a rate of the active material in the electrode can be increased.

As a result, a volumetric energy density of a battery can be improved.

Note here that a pore route of porous core particle is coated with dielectric oxide, and thereby a part of the pore route may be closed.

(Coated Amount)

In the porous dielectric particle of the present invention, a coated amount of dielectric oxide is preferably 1 to 30% by volume with respect to the volume of core particle.

The coated amount is further preferably 1 to 10% by volume, and particularly preferably 2 to 10% by volume.

The coated amount of dielectric oxide is preferably 1 to 30% by volume with respect to the volume of core particle, because a contact area between the high-dielectric oxide and the electrolytic solution can be increased, so that the dissociation degree of the electrolytic solution can be improved and the resistance of the electrolytic solution can be reduced.

(Specific Surface Area)

The specific surface area of the porous dielectric particle of the present invention is not particularly limited, but it is preferably 20 mV/g or more.

The specific surface area is further preferably 100 $m^2/g$ or more, and particularly preferably 500 m/g or more.

When the specific surface area of the porous dielectric particle of the present invention is 20 $m^2/g$ or more, the dissociation degree of an electrolytic solution can be improved, and the resistance of the electrolytic solution can be reduced.

(Particle Size)

The particle size of the porous dielectric particle of the present invention is not particularly limited, but it is preferably about 0.1 μm or more and 10 μm or less, which is equal to or less than the particle size of the active material.

When the particle size is too small, when, for example, the porous dielectric particles of the present invention are blended in at least one of the positive electrode and the negative electrode, they are attached to the surface of the electrode active material, thus inhibiting the electronic conductivity so as to increase the cell resistance.

On the other hand, when the particle size is too large, improvement of the filling rate of the active material in the electrode is prevented.

(Pore Diameter)

The pore diameter of the porous dielectric particle of the present invention is not particularly limited, but it is preferably 1 μm or more and 50 μm or less.

The pore diameter of the core particle is further preferably 2 nm or more and 50 nm or less, and particularly preferably 2 nm or more and 30 nm or less.

When the pore diameter of the core particle is 1 nm or more and 50 nm or less, the dissociation degree of an electrolytic solution can be improved, and the resistance of the electrolytic solution can be reduced.

[Dielectric Oxide]

The dielectric oxide constituting the porous dielectric particle of the present invention is not particularly limited as long as the dielectric oxide is an oxide having a dielectric property.

A variety of substances can be applied.

(Lithium Ion Conductivity)

Among them, an oxide having lithium ion conductivity is preferable.

When the dielectric oxide constituting the porous dielectric particle of the present invention is an oxide having lithium ion conductivity, lithium ions inside particle easily move, and dielectric action is effectively expressed.

Therefore, the dissociation degree of the electrolytic solution is easily improved.

Furthermore, the dielectric oxide constituting the porous dielectric particle of the present invention is preferably an oxide having lithium ion conductivity of $10^{-7}$ S/cm or more at 25° C. The lithium ion conductivity is preferably $10^{-5}$ S/cm or more at 25° C., and particularly preferably $10^{-4}$ S/cm or more at 25° C.

When as the dielectric oxide constituting the porous dielectric particle of the present invention, oxide having lithium ion conductivity of $10^{-7}$ S/cm or more at: 25° C. is used, lithium ions in the particle move more easily, and the dielectric action can be expressed more effectively.

(Powder Relative Dielectric Constant)

The dielectric oxide constituting the porous dielectric particle of the present invention is preferably a ferroelectric oxide having a powder relative dielectric constant of 10 or more.

Ferroelectric oxide having a powder relative dielectric constant of 15 or more is further preferable, and ferroelectric oxide having a powder relative dielectric constant of 20 or more is particularly preferable.

Herein, the powder relative dielectric constant in this specification is a value obtained by the following method.

(Method for Measurement of Powder Relative Dielectric Constant)

The powder relative dielectric constant is calculated by firstly obtaining a relative dielectric constant of a binder from a relative dielectric constant of a binder sheet, then obtaining the relative dielectric constant of a binder/dielectric substance particle integrated sheet, and calculating the powder relative dielectric constant therefrom.

<Relative Dielectric Constant of Binder Sheet>

As a binder, slurry was produced by dissolving polyvinylidene fluoride (PVDF) in N-methyl-2-pyrrolidone (NMP), or by dissolving carboxymethyl cellulose (CMC) in water.

The obtained slurry was cast on aluminum foil or copper foil as current collector foil, and dried at 100° C. to produce a binder sheet. Then, roll press was performed at a linear pressure of 1 t/cm to improve adhesion to the current collecting foil.

The obtained binder sheet was roll-pressed at a linear pressure of 1 t/cm at 135° C. with aluminum foil or copper foil that had been punched in φ16 mm(R) thereon so as to sandwich the current collector foil, and thus a binder sheet sandwiched by the current collector was obtained. For the obtained binder sheet, the electrostatic capacity $C_{bindertotal}$ at 25° C. and at 1 kHz was measured by an automatic equilibrium bridge method using an LCR meter, and the relative dielectric constant $\varepsilon_{bindertotal}$ of a binder sheet was calculated.

In order to obtain the relative dielectric constant $\varepsilon_{binder}$ of the binder of the actual volume portion from the above-obtained relative dielectric constant $\varepsilon_{bindertotal}$ of the binder sheet, the "relative dielectric constant of binder $\varepsilon_{binder}$" was calculated for 20.3 (PVDF) or 4.2 (CMC), respectively, by using the following formulae (1) to (3) when a vacuum dielectric constant $\varepsilon_0$ was $8.854 \times 10^{-12}$, and a relative dielectric constant $\varepsilon_{air}$ of air was 1, where $D_{binder}$ is a volume ratio of the binder, and d is a thickness of the binder layer.

$$\text{Contact area } A \text{ between binder layer of binder sheet and current collector foil} = (R/2)_2 * \pi \quad (1)$$

$$C_{bindertotal} = \varepsilon_{bindertotal} \times \varepsilon_0 \times (A/d) \quad (2)$$

$$\varepsilon_{bindertotal} = \varepsilon_{binder} \times D_{binder} + \varepsilon_{air} \times (1 - D_{binder}) \quad (3)$$

<Relative Dielectric Constant of Binder/Dielectric Substance Particle Integrated Sheet>

Slurry was obtained by mixing dielectric particles in slurry in which the binder had been dissolved such that the binder/dielectric particles in slurry became 50/50 in a volume ratio and dispersing the obtained mixture with a rotation-revolution mixer.

The obtained slurry was cast on aluminum foil or copper foil as current collector foil and dried at 100° C. to produce a sheet in which the binder and the dielectric particles were integrated with each other.

Then, roll press was performed at a linear pressure of 1 t/cm to improve adhesion to the current collecting foil.

The obtained binder/dielectric substance particle integrated sheet was roll-pressed at a linear pressure of 1 t/cm at 135° C. with aluminum foil or copper foil that had been punched in φ16 mm(R) thereon so as to sandwich the current collector foil, and thus a binder/dielectric substance particle integrated sheet sandwiched by the current collector was obtained.

For the obtained binder/dielectric substance particle integrated sheet, the electrostatic capacity $C_{total}$ at 25° C. and at 1 kHz was measured by an automatic equilibrium bridge method using an LCR meter, and the relative dielectric constant $\varepsilon_{total}$ of a binder/dielectric substance particle integrated sheet was calculated.

<Powder Relative Dielectric Constant>

In order to obtain the relative dielectric constant $\varepsilon_{powder}$ of dielectric substance particles of the actual volume portion from the above-mentioned relative dielectric constant $\varepsilon_{binder}$ of the binder, and the relative dielectric constant $\varepsilon_{total}$ of binder/dielectric substance particle integrated sheet, the "powder relative dielectric constant $\varepsilon_{powder}$" was calculated by using the following formulae (4) to (6) when the vacuum dielectric constant $\varepsilon_0$ was 8.854×10−12, the relative dielectric constant $\varepsilon_{air}$ of air was 1, and the relative dielectric constant $\varepsilon_{binder}$ of the binder was 20.3 (PVDF) or 4.2 (CMC), a volume ratio of the binder was $D_{binder}$ and the volume ratio of the dielectric substance particle was $D_{powder}$.

$$\text{Contact area } A \text{ between binder/dielectric substance particle integrated layer and current collector foil}=(R/2)^2 \ast \pi \quad (4)$$

$$C_{total}=\varepsilon_{total} \times \varepsilon_0 \times (A/d) \quad (5)$$

$$\varepsilon_{total}=\varepsilon_{powder} \times D_{powder} + \varepsilon_{binder} \times D_{binder} + \varepsilon_{air} \times (1-D_{powder}-D_{binder}) \quad (6)$$

When ferroelectric oxide having a powder relative dielectric constant of 10 or more is used as the dielectric oxide constituting the porous dielectric particle of the present invention, the dissociation degree of the electrolytic solution can be improved, and the resistance of the electrolytic solution can be reduced.

The ferroelectric oxide having a powder relative dielectric constant of 10 or more is not particularly limited, and, for example, a composite metal oxide having a perovskite-type crystal structure, such as $BaTiO_3$, $Ba_xSr_{1-x}TiO_3$ (X=0.4 to 0.8), $BaZr_cTi_{1-x}O_3$ (X=0.2 to 0.5), and $KNbO_3$, a composite metal oxide having a layered perovskite-type crystal structure, which contains bismuth such as $SrBi_2Ta_2O_3$, $SrBi_2Nb_2O_9$.

In the present invention, the higher the powder relative dielectric constant is, the higher the effect of improving the dissociation degree of the electrolytic solution is. Therefore, among them, at least one of $BaTiO_3$, $Ba_xSr_{1-x}TiO_3$ (x=0.4 to 0.8), $BaZr_xTi_{1-x}O_3$ (x=0.2 to 0.5), and $KNbO_3$, exhibiting high power relative dielectric constant, is preferable.

Furthermore, as the oxide having lithium ion conductivity having a powder relative dielectric constant of 10 or more and having lithium ion conductivity of $10^{-7}$ S/cm or more at 25° C. is not particularly limited, and examples thereof can include a composite metal oxide having a garnet-type crystal structure represented by a chemical formula: L wherein in the formula, A is one type of metal selected from the group consisting of Y, Nd, Sm, and Gd, x is in a range of $0 \leq x<3$, M is Nb or Ta, and y is in a range of $0 \leq y<2$.

Alternatively, examples of the oxide having lithium ion conductivity of $10^{-7}$ S/cm or more at 25° C. include $LiNbO_3$.

Alternatively, examples thereof include a composite metal oxide containing a NASICON-type crystal structure represented by the chemical formula: $Li_{1+x+y}(Al,Ga)_x(Ti,Ge)_{2-x}Si_yP_{3-y}O_{12}$ (wherein $0 \leq x \leq 1$ and $0 \leq y \leq 1$ are satisfied).

In particular, as the dielectric oxide constituting the porous dielectric particle of the present invention, at least one selected from the group consisting of $LiMbO_3$, $Li_{1.3}Al_{0.3}T_{1.7}(PO_4)_3$(LATP), $BaTiO_3$, $Li_7La_3Zr_2O_{12}$ (LLZO), $Li_{6.75}La_3Zr_{1.75}Ta_{0.25}O_{12}$ (LLZTO), $Li_{0.33}La_{0.56}TiO_3$ (LLTO), and $Li_{1.6}Al_{0.6}Ge_{1.4}(PO_4)_3$ (LAGP) is preferably used.

[Core Particle]

Core particles constituting the porous dielectric particle of the present invention are porous particles being substantially spherical. In the porous dielectric particle of the present invention, at least a part of the surface of a core particle is coated with dielectric oxide.

(Material)

Materials of the core particles constituting the porous dielectric particles of the present invention are not particularly limited, and examples thereof include porous silica, zeolite, porous alumina, porous silica, and the like.

Among these, porous silica that is electrochemically stable and easily forms porous fine particles is preferable.

(Specific Surface Area)

The specific surface area of the core particles constituting the porous dielectric particle of the present invention is not particularly limited, and is preferably 20 m$^2$/g or more. The specific surface area is further preferably 100 m$^2$/g or more, and particularly preferably 500 m$^2$/g or more.

When the specific surface area of the core particles is 20 m/g or more, the dissociation degree of the electrolytic solution can be improved, and the resistance of the electrolytic solution can be reduced.

(Particle Size)

The particle size of the core particles constituting the porous dielectric particles of the present invention is not particularly limited, but it is preferably about 0.1 μm or more and 10 μm or less, which is equal to or less than the particle size of the active material.

When the particle size is too small, when, for example, the porous dielectric particles of the present invention are blended in at least one of the positive electrode and the negative electrode, they are attached to the surface of the electrode active material, thus inhibiting the electronic conductivity so as to increase the cell resistance.

On the other hand, when the particle size is too large, improvement of the filling rate of the active material in the electrode is prevented.

(Pore Diameter)

The pore diameter of a core particle constituting the porous dielectric particle of the present invention is not particularly limited, but it is preferably 1 nm or more and 50 nm or less. The pore diameter of the core particle is further preferably 2 nm or more and 50 nm or less, and particularly preferably 2 nm or more and 30 nm or less.

When the pore diameter of the core particle is 1 nm or more and 50 nm or less, a contact area between the high-dielectric oxide and the electrolytic solution is improved, so that the dissociation degree of an electrolytic solution can be improved, and the resistance of the electrolytic solution can be reduced.

[Coating Method]

A method for coating at least a part of surfaces of porous core particles with dielectric oxide is not particularly limited. Examples of the method include sputtering, laser ablation, organometallic chemical vapor deposition, a solution method (sol-gel method), and the like.

[Specific Surface Area Measurement Method]

Specific surface area measurement was performed after drying under reduced pressure using high-performance specific surface area-pore distribution analyzer ASAP2020 available from SHIMADZU CORPORATION (available from SHIMADZU CORPORATION) at 400° C. for 4 hours.

<Electrode for Lithium Ion Secondary Battery>

The electrode for a lithium ion secondary battery of the present invention is an electrode for a lithium ion secondary battery including an electrode active material, and the porous dielectric particle of the present invention.

A configuration of the electrode for a lithium ion secondary battery of the present invention is not particularly limited, and examples thereof include a configuration in which an electrode layer including an electrode mixture including an electrode active material and the above-mentioned porous dielectric particle of the present invention is laminated on a current collector.

The electrode layer may arbitrarily include known components such as a conductive auxiliary agent and a binding agent.

According to the electrode for a lithium ion secondary battery of the present invention, since the porous dielectric particle of the present invention is blended in the electrode, a range of action of dissociation of the electrolytic solution can be enlarged, so that the internal resistance of a cell can be reduced.

Furthermore, since a contact area with the electrolytic solution is increased, an additive amount of the porous dielectric particle of the present invention can be suppressed, and a rate of the active material in the electrode can be increased.

As a result, a volumetric energy density of the battery can be improved.

Furthermore, since the porous dielectric particles of the present invention do not easily constitute an aggregation portion, a state in which porous dielectric particles are uniformly dispersed in the electrode mixture can be easily formed.

As a result, over an entire electrode mixture, a dissociation effect of the electrolytic solution can be acted.

(Blending Amount)

In the electrode for a lithium ion secondary battery of the present invention, the blending amount of porous dielectric particles of the present invention is preferably 0.1 parts by mass or more and 5 parts by mass or less with respect to 100 parts by mass of the entire components of an electrode mixture constituting an electrode.

The blending amount is more preferably in a range of 0.5 parts by mass or more and 5.0 parts by mass or less, and particularly preferably in a range of 0.5 parts by mass or more and 2.0 parts by mass or less.

When the blending amount of the porous dielectric particles of the present invention is less than 0.1 parts by mass with respect to 100 parts by mass of the entire components of an electrode mixture constituting an electrode, the dissociation degree of the electrolytic solution infiltrating into the electrode becomes insufficient.

On the contrary, when the blending amount is more than 5 parts by mass, an amount of electrolytic solution electrode infiltrating into the electrode becomes insufficient, and the movement route of lithium ions inside the electrode is limited.

The electrode for a lithium ion secondary battery of the present invention may be a positive electrode for a lithium ion secondary battery or may be a negative electrode for a lithium ion secondary battery.

In other words, the electrode active material included in the electrode for a lithium ion secondary battery of the present invention may be a positive electrode active material or may be a negative electrode active material.

Even in a case of the positive electrode and the negative electrode, an effect of the present invention can be obtained.

(Current Collector)

A current collector that can be used for the electrode for a lithium ion secondary battery of the present invention is not particularly limited.

Known current collectors used in lithium ion secondary batteries can be used.

Examples of materials of the positive current collector include metal materials such as SUS, Ni, Cr, Au, Pt, Al, Fe, Ti, Zn, and Cu. Examples of materials of the negative electrode collector include SUS, Ni, Cu, Ti, Al, baked carbon, a conductive polymer, conductive glass, an Al—Cd alloy, and the like.

Furthermore, examples of shapes of the electrode current collector include a foil shape, a plate shape, a mesh shape, and the like.

A thickness thereof is not particularly limited, and the thickness can be, for example, 1 to 20 μm, but can be appropriately selected if necessary.

(Active Material)

Electrode active materials included in the electrode for a lithium ion secondary battery of the present invention are not particularly limited as long as they can absorb and release lithium ions, and materials known as the electrode active material of the lithium ion secondary battery can be applied.

When the electrode for a lithium ion secondary battery of the present invention is a positive electrode for a lithium ion secondary battery, examples of the positive electrode active material layer can include $LiCoO_2$, $LiCoO_4$, $LiMn_2O_4$, $LiNiO_2$, $LiFePO_4$, lithium sulfide, sulfur, and the like.

As the positive electrode active material, a material showing noble electric potential as compared with the negative electrode may be selected from materials that can form an electrode.

When the electrode for a lithium ion secondary battery of the present invention is a negative electrode for a lithium ion secondary battery, examples of the negative electrode active material can include carbon materials such as metallic lithium, a lithium alloy, metal oxide, metal sulfide, metal nitride, silicon oxide, silicon, and graphite.

As the negative electrode active material, a material showing base electric potential as compared with the positive electrode may be selected from materials that can form an electrode.

(Disposition of Electrode Layers)

In the electrode for a lithium ion secondary battery of the present invention, an electrode layer including an electrode mixture including an electrode active material and the porous dielectric particle of the present invention as essential components are only required to be formed on at least one surface of the current collector, or may be formed on both surfaces.

It can be appropriately selected depending on types or structures of the objective lithium ion secondary battery.

(Thickness)

A thickness of the electrode for a lithium ion secondary battery of the present invention is not particularly limited, but the thickness is preferably, for example, 40 μm or more.

When the thickness is 40 w or more, and the volume filling rate of the electrode active material is 60% or more, the obtained electrode for a lithium ion secondary battery is a high density electrode. Then, the volumetric energy density of the formed batter cell can reach 500 Wh/L or more.

(Method for Producing Electrode for Lithium Ion Secondary Battery)

The method for producing an electrode for a lithium ion secondary battery of the present invention is not particularly limited. Usual methods in the field of this technology can be applied.

Examples of the method include a method including applying electrode paste as an electrode mixture including an electrode active material and the above-mentioned porous dielectric particle of the present invention as essential components on a current collector, drying thereof, and rolling thereof.

As a method for applying the electrode paste to the current collector, known methods can be applied.

Examples of the methods include roller coating such as applicator rolls, screen coating, blade coating, spin coating, bar coating, and the like.

<Lithium Ion Secondary Battery>

A lithium ion secondary battery of the present invention includes a positive electrode layer for a lithium ion secondary battery having a positive electrode active material layer including a positive electrode active material, a negative electrode layer for a lithium ion secondary battery having a negative electrode active material layer including a negative electrode active material, a separator disposed between the positive electrode layer for a lithium ion secondary battery and the negative electrode layer for a lithium ion secondary battery, and an electrolytic solution.

Then, the positive electrode layer for a lithium ion secondary battery and/or the negative electrode layer for a lithium ion secondary battery includes the above-mentioned porous dielectric particle of the present invention.

[Positive Electrode Layer for Lithium Ion Secondary Battery]

A positive electrode layer for a lithium ion secondary battery as a component element of a lithium ion secondary battery of the present invention has a positive electrode active material layer including a positive electrode active material.

Other configurations are not particularly limited as long as the positive electrode active material layer is provided, and known positive electrode layers that can be used for the lithium ion secondary battery can be applied.

Among them, in the present invention, the positive electrode layer for a lithium ion secondary battery in which an electrode layer made of an electrode mixture including a positive electrode active material and the above-mentioned porous dielectric particle of the present invention is laminated on the current collector is preferable.

[Negative Electrode Layer for Lithium Ion Secondary Battery]

A negative electrode layer for a lithium ion secondary battery as a component element of a lithium ion secondary battery of the present invention has a negative electrode active material layer including a negative electrode active material.

Other configurations are not particularly limited as long as the negative electrode active material layer is provided, and known negative electrode layers that can be used for the lithium ion secondary battery can be applied.

Among them, in the present invention, the negative electrode layer for a lithium ion secondary battery in which an electrode layer made of an electrode mixture including a negative electrode active material and the above-mentioned porous dielectric particle of the present invention is laminated on the current collector is preferable.

[Separator]

A separator as a component element of the lithium ion secondary battery of the present invention is not particularly limited, and known separators that can be used as a lithium ion secondary battery can be applied.

[Electrolytic Solution]

An electrolytic solution to be used in the lithium ion secondary battery of the present invention is not particularly limited, and electrolytic solutions known as an electrolytic solution of the lithium ion secondary battery can be applied.

(Solvent)

As the non-aqueous solvent to be used for the electrolytic solution, a general solvent forming a non-aqueous electrolytic solution can be used.

Examples of the non-aqueous solvents include solvents having a cyclic structure, for example, ethylene carbonate (EC), and propylene carbonate (PC), solvents having a chain structure, for example, dimethyl carbonate (IMC), ethyl methyl carbonate (EMC), and diethyl carbonate (DEC).

Furthermore, partially fluoridated fluoroethylene carbonate (FEC), difluoroethylene carbonate (DFEC), and the like, can also be used.

Furthermore, known additives can be blended with an electrolytic solution. Examples of the additives include vinylene carbonate (VIC), vinyl ethylene carbonate (VEC), propane sultone (PS), and the like.

Furthermore, the electrolytic solution may include an ionic liquid.

Examples of the ionic liquid include pyrrolidinium, piperidinium, imidazolium, and the like, including quaternary ammonium cation.

(Lithium Salt)

A lithium salt included in the electrolytic solution to be used for the lithium ion secondary battery of the present invention is not particularly limited.

Examples thereof can include $LiPF_6$, $LiBF_4$, $LiClO_4$, $LiN(SO_2CF_3)$, $LiN(SO_2C_2F_5)_2$, $LiCF_3SO_3$.

Among them, $LiPF_6$, $LiBF_4$, or a mixture thereof is preferable because they have a high ionic conductivity and a high degree of dissociation.

(Method for Producing Lithium Ion Secondary Battery)

The method for producing a lithium ion secondary battery of the present invention is not particularly limited, and usual methods in the field of this technology can be applied.

EXAMPLES

Next, the present invention will be described based on Examples, but the present invention is not to be limited thereto.

<Materials>

Materials used in Examples and Comparative Examples are shown below.

(1) Electrode Active Material

Positive electrode active material: $LiNi_{0.6}Co_{0.2}Mn_{0.2}O_2$ (NC622) D50=12 μm Negative electrode active material: natural graphite (NG) D50=12 μm (2) Core Particle Porous Silica-1

Porous silica having the following physical property values was formed by the following procedures according to the document "Chemical Communications 2003 NO. 17, p. 2136-2137, Klaitz. et. al". Firstly, 6 g of P123 (copolymer of polyethylene glycol and polypropylene glycol manufactured by Aldrich) was mixed with 11.8 g of 35% concentrated hydrochloric acid in 217 g of water.

Next, 6 g of butanol was added thereto while stirring at 35° C., and the obtained mixture was stirred for one hour.

Next, 12.9 g of TEOS (tetraethyl orthosilicate) was added. The obtained mixture was stirred at 35° C. for 24 hours, and then the polypropylene container was sealed and heated at 130° C. for 24 hours. Precipitates obtained after the above-mentioned treatment were collected and dry-treated at 100° C.

Next, the obtained product was stirred in a hydrochloric acid-ethanol mixed solvent for three hours, and the solid content was collected and heated at 550° C. to obtain porous silica.

D50=2.0 μm
Pore size: 13 nm
Specific surface area: 800 m²/g
  Porous silica-2 (manufactured by Aldrich, Trade name: Porous Silica)
D50=0.5 μm
Pore size: 4 nm
Specific surface area: 900 m²/g
(3) Dielectric Oxide
LiNbO₃ (abbreviation: LNO)
Lithium ion conductivity: $8.0 \times 10^{-7}$ S/cm
Powder relative dielectric constant: 201
D50=0.5 μm
  $Li_{1.3}Al_{0.3}Ti_{1.7}P_3O_{12}$ (abbreviation: LATP)
Lithium ion conductivity: $5.0 \times 10^{-4}$ S/cm
Powder relative dielectric constant: 20
D50=0.5 μm
  BaTiO₃ (abbreviation: BTO)
Powder relative dielectric constant: 55
D50=0.6 μm
<Production of Porous Dielectric Particle>
[Porous Dielectric Particle 1]
(Preparation of Core Particle)

As the core particle, porous silica-1 was prepared.
(Production of Precursor Solution)

To 100 g of ethanol, 17 g of Nb ethoxide and 20.3 g of 10's methanol solution of Li methoxide were added, and the obtained product was stirred to obtain a solution.

To 15 g of the obtained solution, 100 g of ethanol was added to obtain LiNb alkoxide as a precursor solution.
(Formation of Dielectric Oxide Coating Film)

To 38.3 g of the LiNb alkoxide solution obtained above, 10 g of porous silica as a core particle was added. The obtained product was stirred using a stirrer for one hour while heating at 80° C. Then, ethanol, which is a solvent, was evaporated in a rotary evaporator, and then heated and dried in the atmosphere at 140° C. for one hour.

Furthermore, the dried powder was baked at 400° C. for three hours to obtain a porous dielectric particle 1, that was a porous silica coated with LiNbO₃ (lithium niobate: LNO).

The coverage of LNO in the obtained porous dielectric particles 1 was 2.6% by volume with respect to the volume of the porous silica-1 serving as the core particles.

Furthermore, the obtained porous dielectric particle 1 had a particle size of 2.1 μm, a specific surface area of 694 m²/g, and a pore size of 13 nm.
[Porous Dielectric Particle 2]
(Preparation of Core Particle)

As the core particle, porous silica-1 was prepared.
(Production of Precursor Solution)

An aqueous solution in which 30 g of 30% H₂O₂ aqueous solution was added to 17 g of pure water was prepared.

To this aqueous solution, 0.09 g of titanium powder was added. Thereafter, 2 g of 20% ammonia water was added, and the obtained product was sufficiently stirred to obtain an aqueous solution.

To the obtained aqueous solution, 0.06 g of LiOH·H₂O and 0.45 g of diammonium hydrogen phosphate ((NH₃)₂HPO₄) were added.

Furthermore, 0.009 g of Al powder, 2 g of 20% ammonia water, and 30 g of pure water were added, respectively, and the obtained product was stirred for five hours to obtain a precursor aqueous solution.

(Formation of Dielectric Oxide Coating Film)

Into the precursor aqueous solution obtained above, 10 g of porous silica was dispersed.

The obtained product was stirred with a stirrer for one hour while heating at 80° C.

Then, water, which is a solvent, was evaporated by a rotary evaporator, followed by being dried by heating at 140° C. for one hour in the atmosphere.

Furthermore, the dried powder was baked at 600° C. for one hour to obtain porous dielectric particles 2, that were porous silica coated with LATP.

The coverage of LATP in the obtained porous dielectric particles 2 was 6.7% by volume with respect to the volume of the porous silica-1 serving as the core particles.

Furthermore, the obtained porous dielectric particle 2 had a particle size of 2.1 μm, a specific surface area of 512 m²/g, and a pore size of 13 nm.
[Porous Dielectric Particle 3]
(Preparation of Core Particle)

As the core particle, a porous silica-1 was prepared.
(Production of Precursor Solution)

An aqueous solution in which 10 g of 30% H²O₂ aqueous solution was added to 17 g of pure water was prepared.

To this aqueous solution, 0.015 g of titanium powder was added. Thereafter, 0.7 g of 20, ammonia water was added, and the obtained product was sufficiently stirred to obtain an aqueous solution. To the obtained aqueous solution, 0.01 g of LiOH·H₂O) and 0.075 g of diammonium hydrogen phosphate ((NH₃)₂HPO₄) were added.

Furthermore, 0.0015 g of Al powder, 0.7 g of 20% ammonia water, and 30 g of pure water were added, respectively, and the obtained product was stirred for five hours to obtain a precursor aqueous solution.
(Formation of Dielectric Oxide Coating Film)

Into the precursor aqueous solution obtained above, 10 g of porous silica was dispersed.

The obtained product was stirred with a stirrer for one hour while heating at 80° C.

Then, water, which is a solvent, was evaporated by a rotary evaporator, followed by being dried by heating at 140° C. for one hour in the atmosphere.

Furthermore, the dried powder was baked at 600° C. for one hour to obtain porous dielectric particles 3 that were porous silica coated with LATP.

The coverage of LATP in the obtained porous dielectric particles 3 was 13.5% by volume with respect to the volume of the porous silica-1 serving as the core particles.

Furthermore, the obtained porous dielectric particle 3 had a particle size of 2.1 μm, a specific surface area of 343 m²/g, and a pore size of 13 nm.
[Porous Dielectric Particle 4]
(Preparation of Core Particle)

As the core particle, a porous silica-1 was prepared.
(Formation of Dielectric Oxide Coating Film)

Into 40 g of ethanol, 10 g of porous silica was dispersed. As a barium source, a barium solution in which 0.52 g of barium acetate was dissolved in 8 ml of acetic acid was prepared.

As a titanium source, a titanium solution in which 0.7 g of titanium butoxide was dissolved in 8 ml of 2-methoxyethanol was prepared. The above-mentioned three types of solutions were mixed with each other, and the obtained mixture was stirred with a stirrer for one hour while heating at 80° C.

Then, a solvent was evaporated by a rotary evaporator, followed by being dried by heating at 140° C. for one hour in the atmosphere. Furthermore, the dried powder was baked at 300° C. for three hours to obtain porous dielectric particles 4, that were porous silica coated with BaTiO$_3$ (barium titanate: BTO).

The coverage of BaTiO$_3$ in the obtained porous dielectric particles 4 was 2.3% by volume.

Furthermore, the porous dielectric particle had a particle size of 2.1 μm, a specific surface area of 430 m$^2$/g, and a pore size of 13 nm.

[Porous Dielectric Particle 5]
(Preparation of Core Particle)

As the core particle, porous silica-2 was prepared.
(Formation of Dielectric Oxide Coating Film)

Into 40 g of ethanol, 10 g of porous silica was dispersed. As a barium source, a barium solution in which 2.26 g of barium acetate was dissolved in 35 ml of acetic acid was prepared.

As a titanium source, a titanium solution in which 3.03 g of titanium butoxide was dissolved in 35 ml of 2-methoxyethanol was prepared. The above-mentioned three types of solutions were mixed with each other, and the obtained mixture was stirred with a stirrer for one hour while heating at 80° C.

Then, a solvent was evaporated by a rotary evaporator, followed by being dried by heating at 140° C. for one hour in the atmosphere.

Furthermore, the dried powder was baked at 600° C. for three hours to obtain porous dielectric particles 5, that were porous silica coated with BaTiO$_3$ (barium titanate: BTO).

The coverage of BaTiO$_3$ in the obtained porous dielectric particles 5 was 2.3% by volume with respect to the volume of core particles constituting the porous dielectric particle 5.

Furthermore, the porous dielectric particle had a particle size of 0.6 μm, a specific surface area of 484 m$^2$/g, and a pore size of 4 μm.

Examples 1 to 9, Comparative Examples 1 to 4

[Production of Positive Electrode]

With compositions shown in Tables 1 to 3, porous dielectric particles or dielectric oxide particles, acetylene black (AB) as a conductive auxiliary agent, polyvinylidene fluoride (PVDF) as a binder, and N-methyl-2-pyrrolidone (NMP) as a solvent were wet-mixed in a rotation-revolution mixer to obtain a preliminarily mixed slurry. Then, NC14622 as the positive electrode active material and the preliminarily mixed slurry were mixed with each other such that the compositions were those shown in Tables 1 to 3, and subjected to dispersion treatment using a planetary mixer to obtain a positive electrode paste.

The obtained positive electrode paste was applied on one surface of an Al current collector having a thickness of 15 μm, and dried at 120° C. in a vacuum for 10 minutes, then pressed with a linear pressure of 1 t/cm by a roll press, and further dried in a vacuum at 120° C. to produce a positive electrode for a lithium ion secondary battery.

An electrode mixture layer of the obtained positive electrode for a lithium ion secondary battery had a thickness of 70 μm, a basis weight of 22.0 mg/cm$^2$, and a density of 3.2 g/cm$^2$.

Note here that the produced positive electrode was punched into a size of 30 mm×40 mm and used.
[Production of Negative Electrode]

With compositions shown in Tables 1 to 3, porous dielectric particles, acetylene black (AB) as a conductive auxiliary agent, carboxymethyl cellulose (UC) as a binder, and water were mixed with each other, and dispersed using a planetary mixer to obtain a mixture. To the obtained mixture, natural graphite (NG) as the negative electrode active material was mixed, and the obtained mixture was dispersed again using a planetary mixer.

Thereafter, water as a dispersion solvent and styrenebutadiene rubber (SBR) as a binder were added and dispersed so that the compositions are those shown in Tables 1 to 3 to produce a negative electrode paste.

Note here that in an example in which neither a porous dielectric particle nor a dielectric oxide particle was added, only this step was omitted.

The obtained negative electrode paste was applied on a Cu current collector having a thickness of 8 μm, dried at 100° C. for 10 minutes, then pressed with a linear pressure of 1 t/cm by a roll press, and further dried in a vacuum at 100° C. to produce a negative electrode for a lithium ion secondary battery.

An electrode mixture layer of the obtained negative electrode for a lithium ion secondary battery had a thickness of 77 μm, a basis weight of 11.0 mg/cm$^2$, and a density of 1.5 g/cm$^3$.

Note here that the produced negative electrode was punched into a size of 34 mm×44 mm and used.
[Production of Lithium Ion Secondary Battery]

A stacked body including the above-produced positive electrode and negative electrode with a separator sandwiched therebetween was introduced into a container processed in a bag-shape by heat-sealing an aluminum laminate for a secondary battery (manufactured by Dai Nippon Printing Co., Ltd.), an electrolytic solution was injected into the interface of each electrode, and then pressure in the container was reduced to −95 kPa and sealed to produce a lithium ion secondary battery.

As the separator, polyethylene microporous film having one surface coated with about 5 μm of alumina particles was used. Furthermore, as the electrolytic solution, a solution obtained by dissolving 1.2 mol/L of LiPF$_6$ in a solvent of ethylene carbonate, ethyl methyl carbonate, dimethyl carbonate at a volume ratio of 30:30:40 was used.

<Evaluation>

The lithium ion secondary batteries obtained in the Examples and Comparative Examples were subjected to the following evaluation.

(Initial Discharge Capacity)

The produced lithium ion secondary battery was left to stand at measurement temperature (25° C.) for one hour, charged at a constant current of 8.4 mA to 4.2 V, subsequently charged at a constant voltage of 4.2 V for one hour, left to stand for 30 minutes, then discharged at a constant current of 8.4 mA to 2.5 V, and then left to stand for 30 minutes.

The above operation was repeated five times, and the discharge capacity at the fifth discharge was defined as an initial discharge capacity.

The results are shown in Tables 1 to 3.

Note here that for the obtained discharge capacity, an electric current value in which discharging can be completed for 1 H is defined as 1 C.

[Initial Cell Resistance]

A lithium ion secondary battery after measurement of the initial discharge capacity was left to stand at a measurement temperature (25° C.) for one hour, then charged at 0.2 C, and left to stand for 10 minutes with a charge level (SOC (State of Charge)) adjusted to 50%. Next, pulse discharge was performed for 10 seconds with the C rate set at 0.5 C, and a voltage during discharge for 10 seconds was measured. After the lithium ion secondary battery was left to stand for 10 minutes, it was subjected to auxiliary charging to return SOC to 50%, and then left to stand for 10 minutes.

The above-mentioned operation was performed for each C rate of 1.0 C, 1.5 C, 2.0 C, 2.5 C, and 3.0 C, and a voltage was plotted during discharge for 10 seconds with respect to an electric current value in each C rate where the abscissa shows an electric current value and the ordinate shows a voltage.

Then, the gradient of the approximate straight line by the least-squares method obtained from each plot was defined as the internal resistance of the lithium ion secondary battery.

The results are shown in Tables 1 to 3.

[Discharge Capacity after Durability Test]

As a charge and discharge cycle durability test, an operation of performing constant current charge at a charge rate of 1 C up to 4.2 V in a constant temperature bath at 45° C., and then performing constant current discharge at discharge rate of 2 C to 2.5 V was defined as one cycle. The above-mentioned operation was repeated 1000 cycles. After completion of 1000 cycles, the constant temperature bath was changed to 25° C. This state was left to stand for 24 hours. Then constant current charging was performed at 0.2 C to 4.2 V, then, constant voltage charging was performed at a voltage of 4.2 V for one hour, followed being left to stand for 30 minutes. Then, constant current discharge was performed at a discharge rate of 0.2 C to 2.5 V. The discharge capacity after the durability test was measured.

The results are shown in Tables 1 to 3.

[Cell Resistance after Durability Test]

A lithium ion secondary battery after measurement of discharge capacity after a durability test was charged to be (SOC (State of Charge)) 50%, similar to the measurement of the initial cell resistance, and the cell resistance after the durability test was obtained by the same method as in the measurement of the initial cell resistance.

The results are shown in Tables 1 to 3.

[Capacity Retention Rate]

A rate of discharge capacity after the durability test with respect to the initial discharge capacity measured above was obtained and the rate was defined as a capacity retention rate after the durability test.

The results are shown in Tables 1 to 3.

[Cell Resistance Increasing Rate]

A rate of the cell resistance after the durability test with respect to the initial cell resistance measure above was o, and the rate was defined as a cell resistance increasing rate.

The results are shown in Tables 1 to 3.

TABLE 1

| | | Example 1 | Example 2 | Example 3 | Example 4 | Example 5 | Example 6 | Example 7 |
|---|---|---|---|---|---|---|---|---|
| Location of porous dielectric particle | | Positive electrode | Positive electrode | Positive electrode | Positive electrode | Positive electrode | Positive Electrode | Positive electrode |
| Types of porous dielectric particle | | No.1 | No.2 | No.3 | No.4 | No.5 | No.2 | No.2 |
| Composition of positive electrode (wt %) | Porous dielectric particle | 1.0 | 1.0 | 1.0 | 1.0 | 1.0 | 0.5 | 5.0 |
| | Positive electrode active material | 93.1 | 93.1 | 93.1 | 93.1 | 93.1 | 93.6 | 89.1 |
| | Acetylene black | 4.1 | | 4.3 | 4.1 | 4.3 | 4.1 | 4.1 |
| | PVDF | 1.8 | 1.8 | 1.8 | 1.8 | 1.8 | 1.8 | 1.8 |
| Composition of negative electrode (wt %) | Porous dielectric particle | 0.0 | 0.0 | 0.0 | 0.0 | 0.0 | 0.0 | 0.0 |
| | Negative electrode active material | 96.5 | 96.5 | 96.5 | 96.5 | 96.5 | 96.5 | 96.5 |
| | Acetylene black | 1.0 | 1.0 | 1.0 | 1.0 | 1.0 | 1.0 | 1.0 |
| | CMC | 1.0 | 1.0 | 1.0 | 1.0 | 1.0 | 1.0 | 1.0 |
| | SBR | 1.5 | 1.5 | 1.5 | 1.5 | 1.5 | 1.5 | 1.5 |
| Initial performance | Discharge capacity [mAh] | 42.1 | 42.1 | 42.1 | 42.1 | 42.1 | 42.3 | 40.3 |
| | Initial cell resistance value [Ω] | 965.7 | 961.0 | 970.4 | 965.7 | 975.2 | 956.3 | 975.2 |
| Performance after durability test | Discharge capacity [mAh] | 34.1 | 34.2 | 34.3 | 34.3 | 34.5 | 34.4 | 32.7 |
| | Cell resistance value after durability test [Ω] | 1430.5 | 1416.6 | 1444.7 | 1430.5 | 1459.0 | 1402.9 | 1459.0 |
| Capacity retention rate after durability test (%) | | 81.1 | 81.3 | 81.5 | 81.5 | 82.0 | 81.2 | 81.2 |
| Resistance increase rate after durability test (%) | | 148.1 | 147.4 | 148.9 | 148.1 | 149.6 | 146.7 | 149.6 |

TABLE 2

| | | Example 8 | Example 9 |
|---|---|---|---|
| Location of porous dielectric particle | | Negative electrode | Negative electrode |
| Types of porous dielectric particle | | No.1 | No.4 |
| Composition of positive electrode (wt %) | Porous dielectric particle | 0.0 | 0.0 |
| | Positive electrode active material | 94.0 | 94.0 |
| | Acetylene black | 4.1 | 4.1 |
| | PVDF | 1.9 | 1.9 |
| Composition of negative electrode (wt %) | Porous dielectric particle | 1.0 | 0.1 |
| | Negative electrode active material | 95.5 | 96.4 |
| | Acetylene black | 1.0 | 1.0 |
| | CMC | 1.0 | 1.0 |
| | SBR | 1.5 | 1.5 |
| Initial performance | Discharge capacity [mAh] | 42.5 | 42.5 |
| | Initial cell resistance value [Ω] | 965.7 | 975.2 |
| Performance after durability test | Discharge capacity [mAh] | 35.1 | 34.9 |
| | Cell resistance value after durability test [Ω] | 1430.5 | 1459.0 |
| Capacity retention rate after durability test (%) | | 82.5 | 82.0 |
| Resistance increase rate after durability test (%) | | 148.1 | 149.6 |

TABLE 3

|  |  | Comparative Example 1 | Comparative Example 2 | Comparative Example 3 | Comparative Example 4 |
|---|---|---|---|---|---|
| Location of dielectric particle | | — | Positive electrode | Positive electrode | Negative electrode |
| Types of dielectric particle | | — | LNO | LATP | BTO |
| Composition of positive electrode (wt %) | Dielectric particle | 0.0 | 1.0 | 1.0 | 0.0 |
| | Positive electrode active material | 94.0 | 93.1 | 93.1 | 94.0 |
| | Acetylene black | 4.1 | 4.1 | 4.1 | 4.1 |
| | PVDF | 1.9 | 1.8 | 1.8 | 1.9 |
| Composition of negative electrode (wt %) | Dielectric particle | 0.0 | 0.0 | 0.0 | 1.0 |
| | Negative electrode active material | 96.5 | 96.5 | 96.5 | 95.5 |
| | Acetylene black | 1.0 | 1.0 | 1.0 | 1.0 |
| | CMC | 1.0 | 1.0 | 1.0 | 1.0 |
| | SBR | 1.5 | 1.5 | 1.5 | 1.5 |
| Initial performance | Discharge capacity [mAh] | 42.5 | 42.1 | 42.1 | 42.6 |
| | Initial cell resistance value [Ω] | 1000.0 | 965.9 | 1025.0 | 967.0 |
| Performance after durability test | Discharge capacity [mAh] | 34.3 | 34.1 | 31.4 | 34.4 |
| | Cell resistance value after durability test [Ω] | 1674.0 | 1492.0 | 1630.0 | 1536.0 |
| Capacity retention rate after durability test (%) | | 80.8 | 81.0 | 74.7 | 80.8 |
| Resistance increase rate after durability test (%) | | 167.4 | 154.5 | 159.0 | 158.8 |

What is claimed is:

1. An electrode for a lithium ion secondary battery comprising:
    a porous dielectric particle; and
    an electrode active material,
    wherein the porous dielectric particle is a particle to be blended in an electrode of a lithium ion secondary battery including an electrolytic solution,
    wherein the porous dielectric particle comprises: a porous core particle; and a dielectric oxide that covers at least a part of a surface of the porous core particle,
    wherein the dielectric oxide is $Li_{1.3}Al_{0.3}Ti_{1.7}(PO_4)_3$, and
    wherein a blending amount of the porous dielectric particle is 0.1 parts by mass or more and 1.0 parts by mass or less with respect to 100 parts by mass of the electrode for a lithium ion secondary battery.

2. The electrode for a lithium ion secondary battery according to claim 1, wherein the core particle has a specific surface area of 20 $m^2/g$ or more.

3. The electrode for a lithium ion secondary battery according to claim 1, wherein a coated amount of the dielectric oxide is 1 to 30% by volume with respect to a volume of the core particle.

4. The electrode for a lithium ion secondary battery according to claim 1, wherein the electrode is a positive electrode.

5. The electrode for a lithium ion secondary battery according to claim 1, wherein the electrode is a negative electrode.

6. A lithium ion secondary battery comprising:
    a positive electrode for a lithium ion secondary battery having a positive electrode active material layer including a positive electrode active material;
    a negative electrode for a lithium ion secondary battery having a negative electrode active material layer including a negative electrode active material;
    a separator disposed between the positive electrode for a lithium ion secondary battery and the negative electrode for a lithium ion secondary battery; and
    an electrolytic solution,
    wherein the positive electrode for a lithium ion secondary battery and/or the negative electrode for a lithium ion secondary battery are each the electrode for a lithium ion secondary battery according to claim 1.

* * * * *